(12) United States Patent
Arnold et al.

(10) Patent No.: US 6,626,065 B2
(45) Date of Patent: Sep. 30, 2003

(54) HYDROSTATIC TRANSMISSION WITH INTERNAL FLUID EXPANSION CHAMBER

(75) Inventors: George Duncan McRae Arnold, St. Helier (GB); Christian Helmut Thoma, St. Clement (GB)

(73) Assignee: Hydro-Thoma Limited, Jersey (GB)

( * ) Notice: Subject to any disclaimer, the term of this patent is extended or adjusted under 35 U.S.C. 154(b) by 0 days.

(21) Appl. No.: 09/854,512

(22) Filed: May 15, 2001

(65) Prior Publication Data

US 2002/0173398 A1 Nov. 21, 2002

(51) Int. Cl.$^7$ .......................... F16D 39/00; F16H 47/06
(52) U.S. Cl. ................... 74/730.1; 74/606 R; 475/72; 475/83; 60/487
(58) Field of Search .................. 475/72, 73, 74, 475/75, 76, 77, 78, 79, 80, 81, 82, 83; 74/730.1, 606 R, 606 A; 60/456, 487, 488; 184/6.2, 6.22, 11.1, 11.2, 11.3, 11.4, 11.5, 13.1; 210/416.5, 499, 222, 223

(56) References Cited

U.S. PATENT DOCUMENTS

| | | | |
|---|---|---|---|
| 2,622,699 A | * 12/1952 | Mills ................. 210/222 X |
| 3,654,761 A | * 4/1972 | Eickmann ............. 60/488 X |
| 4,987,796 A | * 1/1991 | von Kaler et al. ..... 74/606 R X |
| 5,090,949 A | 2/1992 | Thoma et al. |
| 5,394,699 A | * 3/1995 | Matsufuji ............ 60/487 X |
| 5,515,747 A | * 5/1996 | Okada et al. ........ 74/606 R X |
| 5,617,764 A | * 4/1997 | Komura et al. ....... 74/606 R X |
| 5,622,051 A | * 4/1997 | Iida et al. ........... 60/487 X |
| 5,802,851 A | * 9/1998 | Krantz .............. 60/487 X |
| 5,979,270 A | * 11/1999 | Thoma et al. ........ 475/83 |
| 6,073,443 A | 6/2000 | Okada et al. |
| 6,185,936 B1 | 2/2001 | Hauser et al. |
| 6,186,028 B1 | * 2/2001 | Shimizu ............. 210/499 |
| 6,341,489 B1 | 1/2002 | Iida |

FOREIGN PATENT DOCUMENTS

GB      2062187      * 5/1981   ............ 60/456

* cited by examiner

*Primary Examiner*—Charles A Marmor
*Assistant Examiner*—Ha Ho
(74) *Attorney, Agent, or Firm*—Young & Thompson

(57) ABSTRACT

A hydrostatic transmission and gear transmission located in the same or separate housings structures, and mechanically drivingly connected together by a power transmission shaft. That housing structure surrounding the hydrostatic transmission defining a first internal volume containing the hydrostatic transmission components and providing a receptacle for the hydrostatic fluid. That housing structure surrounding the gear transmission defining a gear compartment sump. As one example, the housing structure surrounding the hydrostatic transmission may further define a second internal volume to operate as an overflow receiver for fluid transferred from the first internal volume. A duct operating in accordance with the siphon principle connects the internal volumes and where a pressure restriction valves ensures an above ambient pressure level in the volumes when the hydrostatic and gear transmission is operating. Alternatively, the gear compartment sump may act as the second internal volume.

53 Claims, 9 Drawing Sheets

HYDROSTATIC TRANSMISSION WITH INTERNAL FLUID EXPANSION CHAMBER

BACKGROUND OF THE INVENTION

1. Field of the Invention

This invention relates to stand-alone hydrostatic transmissions as well as combined hydrostatic and gear transmissions having housing structures provided with either independent or common sumps, such transmissions being usefully employed for many diverse applications such as vehicle drive lines of the type commonly referred to as hydrostatic transaxles.

This invention is particularly concerned with an improved hydrostatic transmission or transaxle drive line disposed within a surrounding housing structure and where the interior space inside the housing can be said to be divided by structural walls or bulkheads into two distinct internal volumes. The first internal volume containing the hydrostatic transmission submerged in its operating fluid whereas the second internal volume, being either in the form of a spill over chamber or alternatively, a chamber containing a gear train, are arranged to be fluidly linked together at all times by a communication duct in the form of a siphon.

2. Description of the Related Art

Hydrostatic transmissions and transaxles are increasingly being used in the lawn care industry and for other outdoor power equipment duties such as snow-blowing. They have become the preferred choice for power transmission drive lines; for example, in lawn and garden tractors with most employing a single hydraulic pump fluidly connected to a single hydraulic motor. Although in most instances single motor hydrostatic transmissions coupled by speed reduction gearing to a mechanical differential, applications also exist where two hydraulic motors are used and where each hydraulic motor is connected by a respective gear train to axle output shafts. Furthermore, two hydraulic pumps can also be used with two such hydraulic motors to create a hydrostatic transmission for each drive wheel which can be useful for zero-turn radius vehicle applications. Occasionally, single motor hydrostatic transmissions are used without the addition of a mechanical differential, such that the hydraulic motor is coupled by speed reduction gearing to a single output shaft, and in these instances, the output shaft may be the axle driving one wheel of the vehicle or be arranged to drive the axle of the vehicle by an interconnecting chain drive.

All hydrostatic transmission require hydrostatic power transmission fluid in order to operate and the fluid acts as the medium to convey power between the pump and motor of the hydrostatic transmission. As the positive displacement fluid pumping mechanisms used by all hydrostatic transmissions and hydrostatic transaxles require careful and accurate manufacture to achieve the necessary close tolerance fits in order to minimize internal fluid leakage losses associated with high-pressure performance, a preferred practice is to prevent damaging contamination generated by general wear and tear in the power transmitting gear train from reaching the pressurised circuit of the hydrostatic transmission. By removing the chances for damaging particles of contamination from entering the hydrostatic pressurised circuit, especially important when sintered powder-metal gears are used in the gear train, a long and useful working life for the hydrostatic transmission can be expected.

Although by no means essential, it can nevertheless be desirable to position the hydrostatic mechanism in a fluid compartment which is physically separate from any adjacent compartments in which the gear train is located such that no exchange of fluid can take place and whereby damaging contamination in the gear train compartment remains confined to that compartment. Contamination containment by way of separate compartments is shown in U.S. Pat. No. 5,090,949 titled Variable Speed Transaxle, expressly incorporated herein by reference. Here a bulkhead is provided in the housing which carries a shaft seal, the shaft seal operating on the interconnecting drive shaft which mechanically couples the hydraulic motor of the hydrostatic transmission in the hydrostatic compartment to the first reduction gear of the gear train in the adjacent gear train compartment. As such, further quantifiable benefits are gained as the compartment providing the sump for the gear train need only contain the bare minimum quantity of oil to satisfy lubrication considerations. Thus by relying what in effect is "splash lubrication", expense is saved as the quantity of fluid needed is less and the efficiency of power transmission is improved as the associated drag losses of the fluid contacting the rotating gears is much less then with a sump carrying a full capacity of oil.

On the other hand, with some hydrostatic transaxles, the hydrostatic transmission is arranged to operate within the very same oil bath as the speed reduction gearing (and mechanical differential when included) and such designs are commonly referred to as "common sump" types. Typically, the gear train and the hydrostatic transmission lie adjacent one another at the same elevation and the oil level in the sump is kept near to the brim to ensure that the hydrostatic components remain properly submerged at all times and also to avoid any ingestion of air. With a gear train operating submerged in the oil bath, power losses are greater due to the increase in fluid friction associated with the wetted area in contact with the oil than would be the case with the "splash lubrication" types mentioned earlier. Such gear drag losses can be especially noticeable in winter time when the gears are required to revolve from rest in a sump in which the oil can be in an extremely viscous initial state, and the resulting higher than normal operational loads imposed on the components in the drive train are unavoidable. As it is not possible to select oils with different properties in the common sump design, a problem is posed as the optimum fluid type which would normally be selected as the preferred lubricant for a gearbox will have completely different characteristics as compared to the type of power transmission fluid most suited for the efficient operation of a hydrostatic transmission. Typically a gear oil tends to be thicker with a high viscosity range whereas an automatic transmission fluid ("ATF") tends to be much thinner with a lower viscosity curve. As the hydrostatic transmission normally prevails when a conflict in design arises, it is accepted that the gear train may be operated in a generally adverse environment of low viscosity fluid such that accelerated wear and resulting higher contamination levels are more likely. The common sump design has a further limitation in that grease cannot be employed as the lubricant for the gear train. For certain applications, grease can be a more economic choice of lubricant.

Under normal atmospheric conditions, hydraulic fluids contain about 9% by volume of dissolved air which has virtually no effect on the physical properties of the fluid and therefore does not lead to any reduction in the performance of the system. However, should any appreciable quantity of undissolved air be present, the fluid will be prone to foaming problems, especially should the fluid experience excessive agitation, for instance, by any revolving elements such as gears being operated in only a partially submerged condition in the fluid sump. If such foaming occurs, it will rapidly lead to the destruction of the hydrostatic transmission. It is also a physical characteristic of the fluid to expand and contract in volume in relation to changes in its temperature. In general terms, the volume of oil increases by about 0.7% for every increase in temperature of 10 deg. C. and as hydrostatic transaxles can operate at below sub-zero ambient temperatures as well as on occasion above 100 deg. C. oil temperature, it is necessary to include an additional dead space volume of about 8% to allow for such volume expansion to occur without restriction over its initially contracted volume state. Accordingly, the fluid level in the sump rises and falls in relation to such temperature variation.

Quite often, an external expansion tank has to be fitted to the transaxle housing to cater for such volume changes in the quantity of fluid held in the sump. Should the tank be vented to atmospheric and rely on gravity-fed to work, such an external expansion tank can be troublesome to include as it must then be situated directly above the transaxle itself. Frequently the space available under the frame of the vehicle is needed for rear-discharge ducts for the grass clippings, and therefore, little space remains between the chassis and the transaxle for an adequately sized header or expansion tank. Recent attempts to overcome this problem are disclosed in U.S. Pat. Nos. 6,073,443 and 6,185,936. Both patents show the use of a siphon to connect the internal chamber of a hydrostatic transaxle to an external tank, the siphon allowing the tank to be located to one side of the transaxle housing exterior and at an elevation below the fluid level in the internal chamber. Although this solution does overcome one problem, namely the lack of available height in the installation, such external tanks may be vunerable to being damaged, for instance by stones kicked up by the revolving grass mower blades puncturing the tank and allowing fluid to escape to the environment. Furthermore, during severe winter conditions, a start-up of the hydrostatic transmission in such conditions while fluid in the siphon is in a semi-frozen state may cause the rotary seals in the hydrostatic transaxle to blow out.

There therefore is a need for a new solution to overcome the above mentioned disadvantages, and in particular there would be an advantage if the volume change in the fluid held in hydrostatic transaxle could be accommodated in a more protected and heat insulated environment inside in oppose to outside the transaxle housing. Thus a solution whereby the external expansion/header tank could be entirely eliminated would have the additional advantage of reduced cost.

Although it has been known for the housing for the hydrostatic transaxle to be manufactured slightly larger than is strictly necessary in order to enable an additional space or void to be inclined near the top to cater for the expanded volume of fluid, such a solution is not always practical. However, this solution will work well so long as the air present in the void does not become mixed in with the oil before the oil has sufficiently warmed to expel, through a breather, the air pocket from the void. Such a breather vent or passage is normally positioned at the highest position in the housing, and allows the free flow of atmospheric air in either direction from the void such that the fluid level in the sump can rise and fall depending on the temperature condition of the oil. Even so, it is difficult to completely eliminate the chances for mixing of the air and the oil and the risk is ever present so long as the revolving componentry of the hydrostatic transmission, such as the input drive shaft to the hydraulic pump or the ring gear of the differential, are able to break through the surface of the fluid. In practice, as more oil has to be carried in a common sump transaxle as compared to a design having separate and distinct chambers for the hydro and gearing as mentioned earlier, a larger dead space volume has to be included to take care of the resulting increased volume expansion. Consequently as the oil warms up towards its normal operating temperature and before its expanded volume has yet to reach a maximum, the remaining void or space situated in close proximity with the highest positioned shaft or gear still contains some air, and as these revolving components break through the surface of the oil, the induced severe agitation is likely to led to air being pulled into the oil. Should such mixing occur to any great degree, it can be detrimental to the performance of the hydrostatic transmission as well as result in cavitation erosion on the load carrying bearing surfaces accompanied by pressure shocks and noises. The problem is further compounded should the undissolved air in the form of foam escape via the breather to pollute the environment.

A further problem can occur should the sump be insufficiently filled to the correct level of oil, as too low a level of oil can later cause the oil to aerate and foam when the transaxle is operated, whereas too much oil can result in it being expelled to the environment via the breather passage once it has expanded due to temperature rise.

A typical problem encountered with vertical input shaft machines, should the oil level be lower then specified, is premature failure of the related bearing or seal due to a lack of lubrication. Furthermore, such naturally vented aspirated hydrostatic transaxles once left to cool after use in humid atmospheric conditions, draw moist air through the breather as soon as the oil begins to contract in volume and often this results in mist in the form of condensation of water vapour forming on the walls of the sump. Such entrained moisture, if not at once expelled as steam by the hot oil when the transaxle is once more in use, can even in small quantities over a period of time accelerate sludging of the oil by forming emulsions and by promoting the coagulation of insolubles such as dust particles that are also drawn through the breather as particles of solid matter as the unit cools after use. In general, air entering the sump causes the gradual oxidation of the oil and this deterioration in the lubricating properties of the oil ultimately lowers the life span of the hydrostatic transmission. Such a deterioration in the quality of the fluid can be rectified by oil changes at regular service intervals, but to undertake this is both costly and complicated to do due to the nature of the construction of such transaxles.

There therefore would be an advantage to be able to take care of volume changes in the hydrostatic transaxle without either recourse to using an inconveniently positioned external expansion tank or by having to rely on an internal dead space void above the fluid with its attendant risk in the formation of foam. There would be further advantage if environmental airborne contaminants as well as moisture be entirely prevented from entering the first internal volume containing the hydrostatic transmission components, or at the very least be allowed to be first absorbed in the fluid contained in the second internal volume in order to thereby slow and impede their progress towards entering the first internal volume.

Hydrostatic transmissions tend to be quieter in operation and work more efficiently and effectively when the fluid within the low-pressure side of the closed-loop circuit is charged or boosted from an auxiliary pump. The addition of such an auxiliary pump increases the manufacturing cost of a hydrostatic transmission and often requires a higher power output from the engine in order to drive both the auxiliary pump and the main pump of the hydrostatic transmission. There would therefore be an advantage if the hydrostatic circuit could be pressurized without having to include an auxiliary pump.

SUMMARY OF THE INVENTION

It is one of the objects of this invention to create a positive head on the hydrostatic fluid entering the low-pressure passage of the hydrostatic transmission without recourse to using a charge pump. Preferably the spill over chamber or the compartment used to house the gear train is sealed from the environment, and a rise in pressure in the spill over chamber or gear compartment aided or induced by the expanding volume of fluid in the hydrostatic compartment produces a net increase of pressure experienced by the low-pressure passage of the hydrostatic transmission.

It is a further object of the invention to improve the running efficiency of the speed reduction gearing used in hydrostatic transaxles. To achieve this object, the surface level of lubricant in the gear sump is automatically adjusted in direct proportion to the operational temperature of the fluid contained within the hydrostatic chamber. Having initially a low level of lubricant in the gear sump on the one hand lessens the adverse effect of power-retarding drag losses, especially during cold weather winter operation, whereas on the other hand, a rising level of lubricant in the gear sump can ensure good lubrication even when temperatures are elevated and viscosity is low. It is therefore a still further object of the invention to enhance the operational characteristics for the hydrostatic transmission by performance matching with respect to the operation of the speed reduction assembly irrespective of the temperature conditions in the environment.

One aspect of this invention is to make better use of the interior space inside the housing and thereby attend to fluid volume changes due to fluid temperature variation, and as such, a portion of the interior space inside the housing serves as an overflow receiver for the hydrostatic fluid in the first internal volume. Catering for fluid volume change internally is a significant improvement over current transaxle practice, as traditional transaxle practice is to rely on external paraphernalia to achieve this end. External devices as such can be prone to leakage and it is therefore a further object of this invention to provide a new and novel solution whereby a fluid expansion chamber is incorporated internally rather than externally in a hydrostatic transmission or a hydrostatic transaxle.

As one example of the invention, an overflow receiver for the administration of volume changes in the first internal volume can be incorporated in a hydrostatic transmission of the stand-alone type. As often there are no gears needed in such stand-alone types, the overflow receiver as the second internal volume, is fluidly connected by the siphon to the first internal volume, so that expansion and contraction of fluid surrounding the hydrostatic transmission components can occur without restriction. The over-flow receiver may be vented to atmosphere or preferably, remains sealed such that fluid entering it from the first internal volume causes internal pressuization in the over-spill receiver as well as in the first internal volume and thereby enhancing the operational characteristics of the hydrostatic transmission.

As a further example of the invention, the overflow is in the form of the gear compartment sump.

In one form thereof, the invention is embodied as a hydrostatic and gear transmission having an integral or combined housing formation whereby the interior space provided by the housing formation can be said to comprise a first internal volume expressly used for the purpose of accommodating components comprising the hydrostatic transmission and a second internal volume expressly used for the purpose of accommodating components of the gear transmission. The first internal volume contains the hydrostatic transmission submerged in its operating fluid whereas the second internal volume provides a fluid sump to lubricate the speed reducing gearing. First and second internal volumes are arranged to be fluidly linked together at all times by a communication duct in the form of a siphon such that any change in the volume of the fluid held by the first internal volume due to temperature change is translated by a flow of fluid through the siphon to effect an equal but opposite volume change in the fluid held by the second internal volume. The gear compartment sump may be vented to atmosphere or preferably, remains sealed such that fluid entering produces internal pressuization of the first internal volume such that the operational characteristics of the hydrostatic transmission may be enhanced.

Regardless whether the second internal volume be so configured as to be able to accommodate the gear train or not, it is to be preferred that the first region should remain completely full of hydrostatic fluid at all times.

According to the invention from another aspect, the interior space inside the housing can be said to be divided by structural walls or bulkheads to form these two distinct internal volumes.

Since the overflow receiver serves to receive displaced fluid from the first internal volume containing the hydrostatic transmission, there is little possibility for fluid from the first internal volume to escape into the environment. It is also an object of the invention to provide a simple contamination trap juxtapose the open-end of the siphon duct in the second internal volume so to reduce the likelihood of contamination from being able to enter the first internal volume and damaging the hydrostatic transmission.

In the detailed description and drawings which follow, the internal fluid expansion chamber for a hydrostatic transmission is shown in one form for both the first and second embodiment.

BRIEF DESCRIPTION OF THE DRAWINGS

The above mentioned and other novel features and objects of the invention, and the manner of attaining them, may be performed in various ways and will now be described by way of examples with reference to the accompanying drawings, in which.

DETAILED DESCRIPTION OF THE PREFERRED EMBODIMENTS

Figure 1:
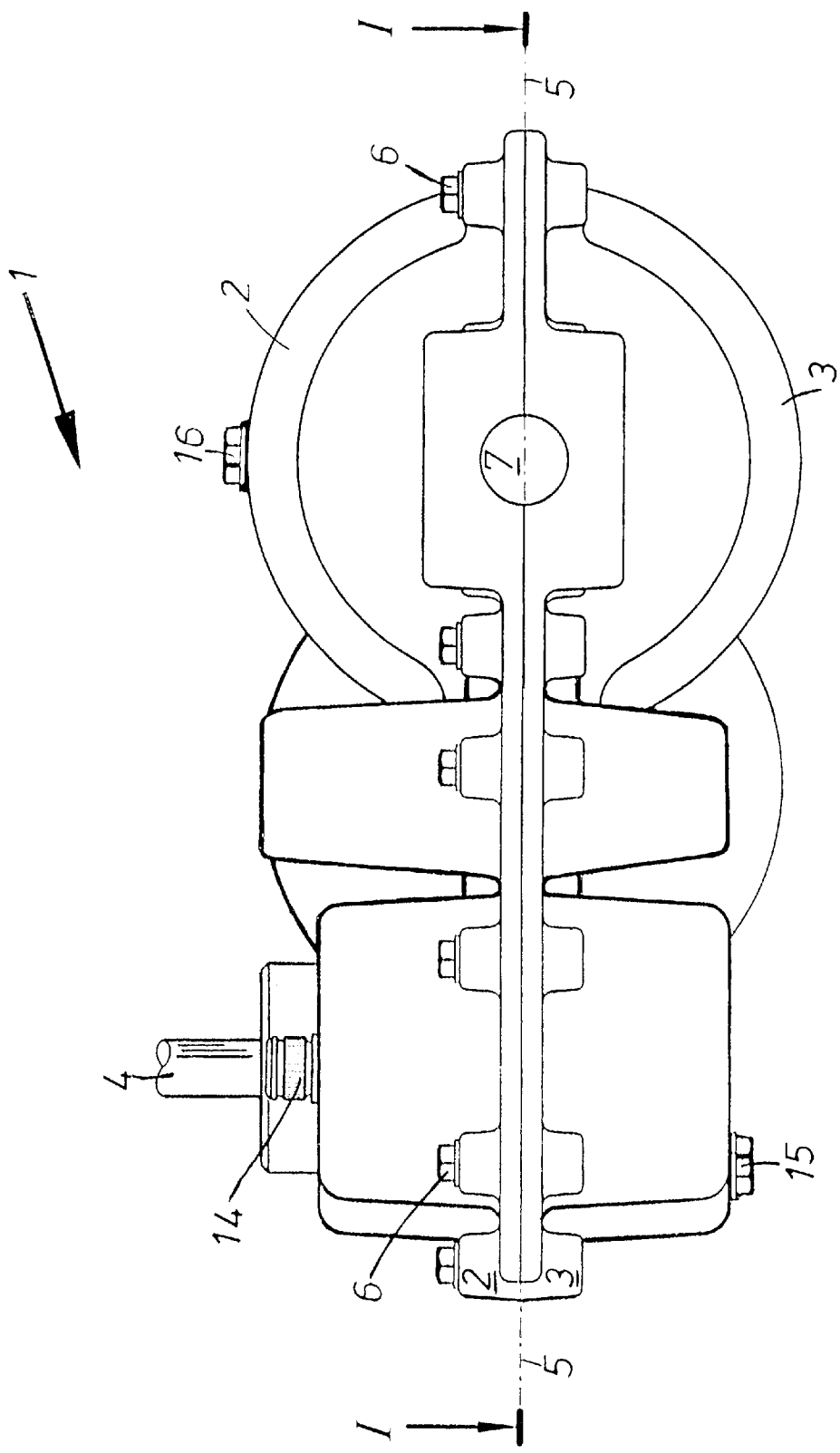
FIG. 1 is a side view of a hydrostatic transaxle in accordance with a first embodiment of the present invention.
Figure 2:
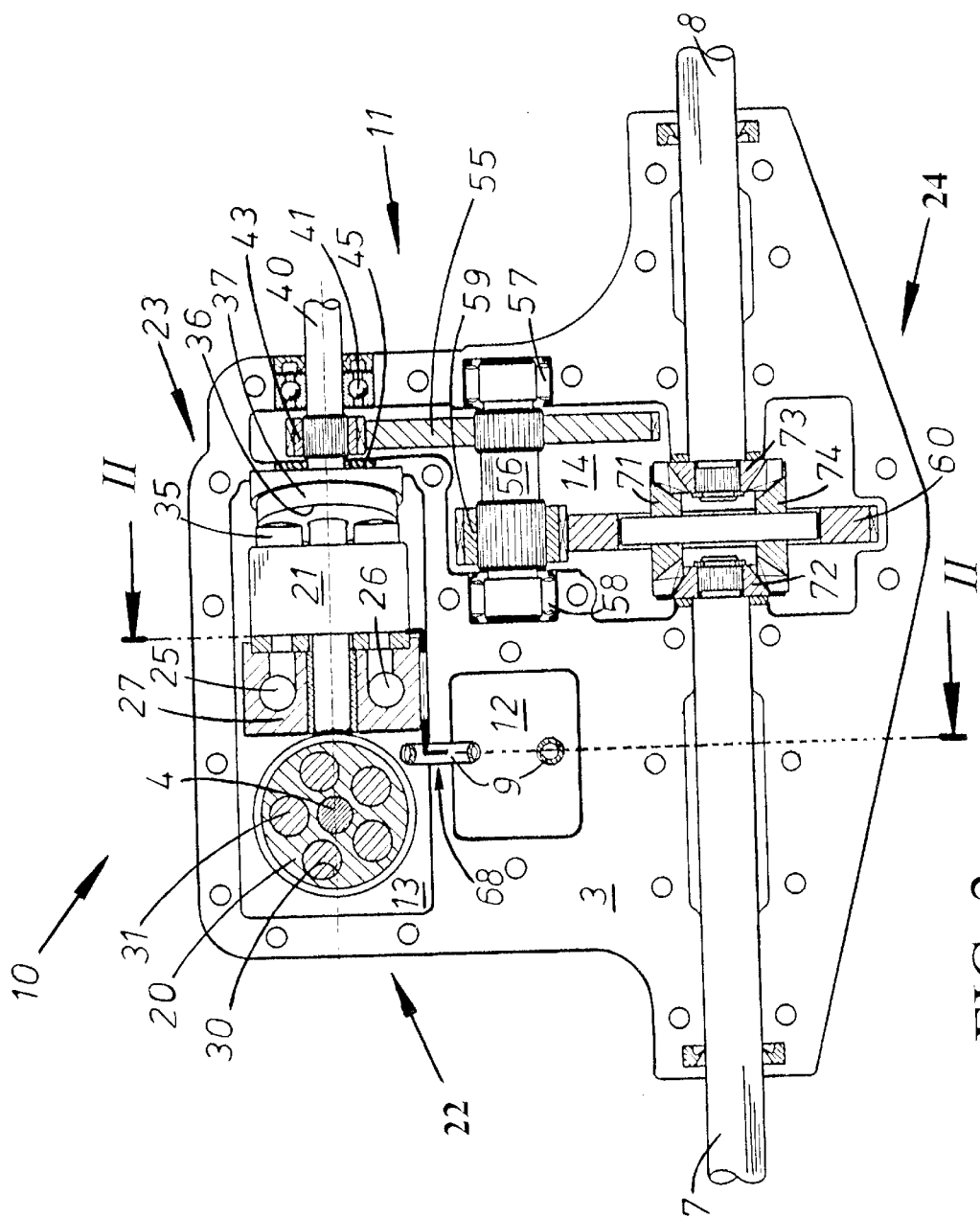
FIG. 2 is a plan view of the hydrostatic transaxle of FIG. 1 along the section line I—I.
Figure 3:
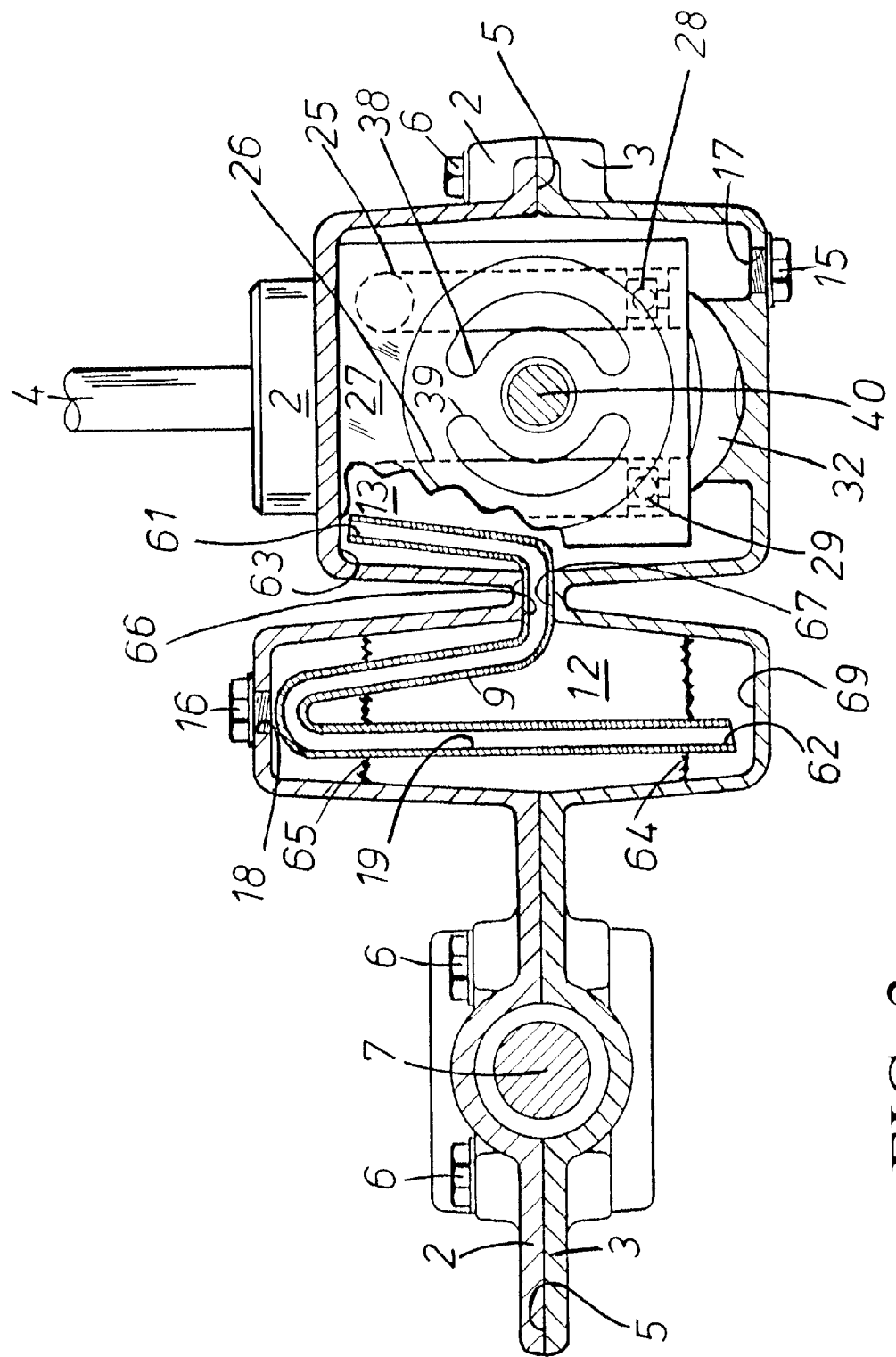
FIG. 3 is a further sectioned view of the hydrostatic transaxle on line II—II of FIG. 2.

For the embodiment of the invention depicted by FIGS. 1 to 3, the hydrostatic and gear transmission is in the form of a hydrostatic transaxle designated by the numeral 1 and has by way of example a housing structure comprising an upper cover housing element 2 joined to a lower case housing element 3 along parting-plane 5. An input drive-shaft 4 is included which is rotatably supported in the housing structure as is shown protruding from the upper cover housing element 2. Input drive-shaft 4 is connected either directly, or via a belt, to a prime mover such as an internal combustion engine. Parting-plane 5 here shown coincident with the axis for the output axle shafts 7, 8, but could also be positioned offset to one side of the shafts 7, 8 axis in a parallel but not coincident relationship. The structure of the housing may also, just to cite one other alternative example, have one or more parting-planes disposed perpendicular with respect to the axis of the axle shafts. Irrespective of whichever housing arrangement is chosen, the housing has to accommodate both the hydrostatic transmission as well as the gear transmission in the form of a lubricated gear train. The gear train is disposed in a gear sump containing either oil or grease as the lubricant for the gears, and preferably, the lubricant for the gears is prevented from being able to mix with the hydrostatic fluid of the hydrostatic transmission. Plugs 15, 16 are provided in the housing in order for hydrostatic fluid and gear lubricant into the inserted.

FIG. 2 shows the interior of the hydrostatic transaxle with internal elements comprising the hydrostatic and the gear transmission positioned in place in housing element 3. At the housing interface between housing elements 2, 3 which happens in these embodiments to be conincident with parting-plane 5 and best seen in FIG. 3, a gasket seal or preferably a liquid gasket sealant is applied to cover the engaging surfaces so to produce a sealingly tight contact once upper housing element 2 is located and secured to housing element 3. A plurality of bolts or screws 6 being used to secure the housing elements 2, 3 together.

Thus, in the assembled condition or state, housing elements 2, 3 can be said to divide the interior space into three distinct regions, one region expressly used for a hydrostatic transmission denoted by the reference numeral 10; another region expressly used for a gear transmission denoted by the reference numeral 11; and a third region which according to both the first and second embodiments of this invention, is the fluid expansion chamber which here is in the form of the overflow receiver as denoted by the reference numeral 12.

According to both first and second embodiments of the invention, the overflow receiver in this particular form of internal fluid expansion chamber for the hydrostatic transmission has the sole function for taking care of any fluid volume changes occurring in the region containing the hydrostatic transmission. However, it may be helpful at this time to note that according to both the third and fourth embodiment of the invention, there the overflow receiver in an alternative form of internal fluid expansion chamber has a dual function: firstly, as it is the gear compartment sump it must therefore contain both gearing and lubricant, and secondly, it must carry any fluid displaced from the region containing the hydrostatic transmission due to fluid volume changes occuring in that region.

For the purpose of definition therefore, that region in the housing in which the components of the hydrostatic transmission 10 are disposed is the first internal volume denoted by reference numeral 13, and this is true for all four embodiments of the present invention. As such, the first internal volume 13 can be said to be the receptacle for the hydrostatic fluid surrounding the components of the hydrostatic transmission 10.

Therefore components of the hydrostatic transmission 10 are contained in first internal volume 13 and the second internal volume, as overflow receiver 12, receives and supplies fluid, as and when necessary, from the first internal volume 13 via an intercommunication duct 9 having interior bore 19 and where duct 9 preferably operates in accordance to the siphon principle. As shown, overflow receiver 12 is conveniently located in relatively close proximity to first internal volume 13.

With this as well as in the second embodiment, hydrostatic power transmission fluid is associated with both second internal volumes 13, 12 whereas only gear lubricant is associated with the separate region in which the gear transmission 11 is located. This separate region for the purposes of definition will now be referred to as the gear compartment sump and is denoted by the reference numeral 14. The gear transmission 11 which is required in order to mechanically couple the hydraulic motor of the hydrostatic transmission to the output shaft or shafts such as axle output shafts 7,8 may, when necessary, include a mechanical differential 24.

Hydrostatic transmission 10 is comprised of at least one hydraulic pump 22 fluidly coupled to at least one hydraulic motor 23, and where respective cylinder-barrels shown as 20, 21 of the hydrostatic-transmission pump 22 and motor 23 are mounted perpendicular to one another such that the rotating axis of the pump cylinder-barrel 20 is vertical and arranged parallel and co-axial with respect to the input-drive shaft 4 to which it is fixed for rotation whereas the rotating axis of the motor cylinder-barrel 21 is parallel with respect to the rotating axis of the axle-shafts 7, 8. To control the speed and forward/reverse direction of the vehicle in which this hydrostatic transaxle is fitted, as shown in FIG. 1, a protruding speed control-shaft 14 from housing element 2 is provided, the control-shaft being journalled in the housing and connecting internally inside the unit with the tiltable swash-plate 32 of the hydraulic pump 22. Fluid passages 25, 26 are provided a fluid distributor member 27 which act to fluidly couple the pump 22 to the motor 23 as is well known in the art and commonly referred to as a closed loop fluid circuit. A respective check-valve 28, 29 is included for each passage 25, 26 to allow the admittance of make-up fluid into passages 25, 26 in order that the hydrostatic transmission 10 can recover any fluid loss during operation because of high-pressure leakage.

The cylinder-barrel 20 of the pump 22 is provided with a plurality of axial cylinder-bores 30, each bore 30 containing a respective piston 31 and where each piston 31 is being axially urged outwards by a spring (not shown) located behind the piston 31 in the bore 30 to engage a swash-plate 32. Each cylinder-bore 30 is arranged to communicate in sequence with a pair of arcuate-shaped ports (although not visible they are generally the same as those arcuate-shaped ports 38, 39 shown for the motor 23 in FIG. 3) on the fluid distributor member 27 that connect with respective passages 25, 26. The cylinder-barrel 21 of the motor 23 is almost in all respects identical to that of the pump, and carries with it a series of axially sliding pistons 35 which are operatively connected to the operational surface 36 of an inclined thrust plate 37. FIG. 3 shows the pair of arcuate-shapes ports 38, 39 used for transferring fluid from passages 25, 26 to the cylinder-barrel 21 of the motor 23. Cylinder-barrel 21 is fixedly attached to drive shaft 40 and because of the piston 35 reaction on inclined thrust plate 37, an angular driving moment is created on the cylinder-barrel 21 which is then caused to revolve.

As drive shaft 40 must pass from the motor 23 in the first internal volume 13 and connect with gear train 11 in the gear compartment sump 14 in order for the transfer of power between motor 23 and gear train 11, a shaft seal 45 is needed so that hydrostatic fluid is prevented from escaping first internal volume 13 to mix with the gear lubricant contained in the gear compartment sump 14. When the first internal volume is intended to operate under pressurized conditions, it is preferable that good quality shaft seal is used such as the well known types manufactured by the company Freudenberg.

Drive shaft 40 supported in the housing by at least one bearing 41 passes through seal 45 so that the motor 23 of the hydrostatic transmission 10 can be connected to the first speed reducing gear 43 of the gear train 11. Gear 43 meshes with gear 55 fixed to intermediate shaft 56 to cause rotation of said shaft 56. Intermediate shaft 56 is supported by bearings 57, 58 in the housing elements 2, 3 and has a further gear 59 attached to it, gear 59 meshing with ring gear 60 of the differential assembly 25. The differential assembly 25 includes four internal gears, three being visible in FIG. 2 and numbered 71, 72, 73, 74 and where gears 72, 73 are fixed on respective axle shafts 7, 8. The inclusion of a differential assembly is important as it allows normal differentiation between the left and right drive wheels of the vehicle and helps prevent lawn damage especially when tight turns are undertaken. However, as there are applications where no such differentialled action is required, in these instances, a single axle shaft may be used instead of the two as shown in this embodiment. In the case of a single axle shaft, this shaft can be arranged to extend outwardly on one or both sides from the housing.

Once assembly of the hydrostatic transaxle 1 has been completed, the unit can be placed upside down so that first internal volume 13 can be filled with power transmission fluid through hole 17. At this time, both plug 15, 16 have been removed from the housing so that respective holes 17, 18 are open. Once first internal volume 13 is full of fluid, excess fluid is transferred through the interior 19 of duct 9 and enters the overflow receiver 12 which is observed as escaping fluid from hole 18. At this point, plug 15 is attached to housing element 3 and tightened on threaded hole 17. This stops any further flow of fluid through the duct 9 and the unit can be moved back to its upright position. Then once sufficient fluid has been added through hole 18 into the overflow receiver 12 to ensure the entrance 62 of duct 9 is submerged below the oil level shown as 64, plug 16 can be attached to housing element 2 and tightened on threaded hole 18. It should be noted the exact fluid levels as shown in these embodiments of the invention, for instance, upper fluid level 65 and lower fluid level 64 in FIG. 3., are for purely illustrative purposes only, in order to show that the fluid level can change during operation of the hydrostatic transmission.

In this invention, the form of the siphon duct 9 used is arranged to have entrance 61 close to the upper interior surface 63 in first internal volume 13 and from there extending downwards before turning horizontally to be parallel and coincident with respect to parting-plane 5. The horizontal portion of the duct 9 being arranged to locate in semi-cylindrical surfaces 66, 67 provided in respective housing elements 2, 3 to form a corridor 68 denoted in FIG. 2. between respective internal volumes 13, 12 for the passage of the duct 9. An anaerobic sealing product is applied at the interface of the siphon portion engaging with semi-cylindrical surfaces 66, 67 so ensuring that the only way for fluid transfer to occur between first and second internal volumes 13, 12 is through the interior of the duct 9.

As the duct 9 protrudes through into second internal volume 12, it is arranged to turn upwards in a direction towards plug 16 before turning downwards and extending towards lower interior wall 69 of overflow receiver 12. Preferably, entrance 62 of duct 9 should remain submerged at all times below fluid level 64.

The first internal volume should remain completely full of hydrostatic operating fluid during the service life of the hydrostatic unit, and preferably at a sufficiently high level so that entrance 61 of siphon 9 remains submerged. The first internal volume is arranged to communicate through a siphon duct to the overflow receiver 12 in order that volume changes in the first region cause the level of fluid in the spill-over chamber to rise and fall. During operation of the hydrostatic transmission 10, as the fluid contained in the first internal volume 13 warms up and expands, the expansion in the fluid causes a flow of the excess fluid through the siphon duct 9 into overflow receiver 12. The initial level 64 of fluid in overflow receiver 12 rises and denoted by the high fluid level 65, and because in this embodiment, plug 16 seals overflow receiver 12 from the environment, the air inside above the fluid level 65 is compressed with the result that the pressure level in the fluid in the first internal volume 13 is also increased such that the ability for make-up fluid to be taken into the closed-loop circuit 26, 26 of the hydrostatic transmission 10 through the check-valves 28, 29 is enhanced thereby improving the operating characteristics of the hydraulic pump 22 and motor 23.

Figure 4:
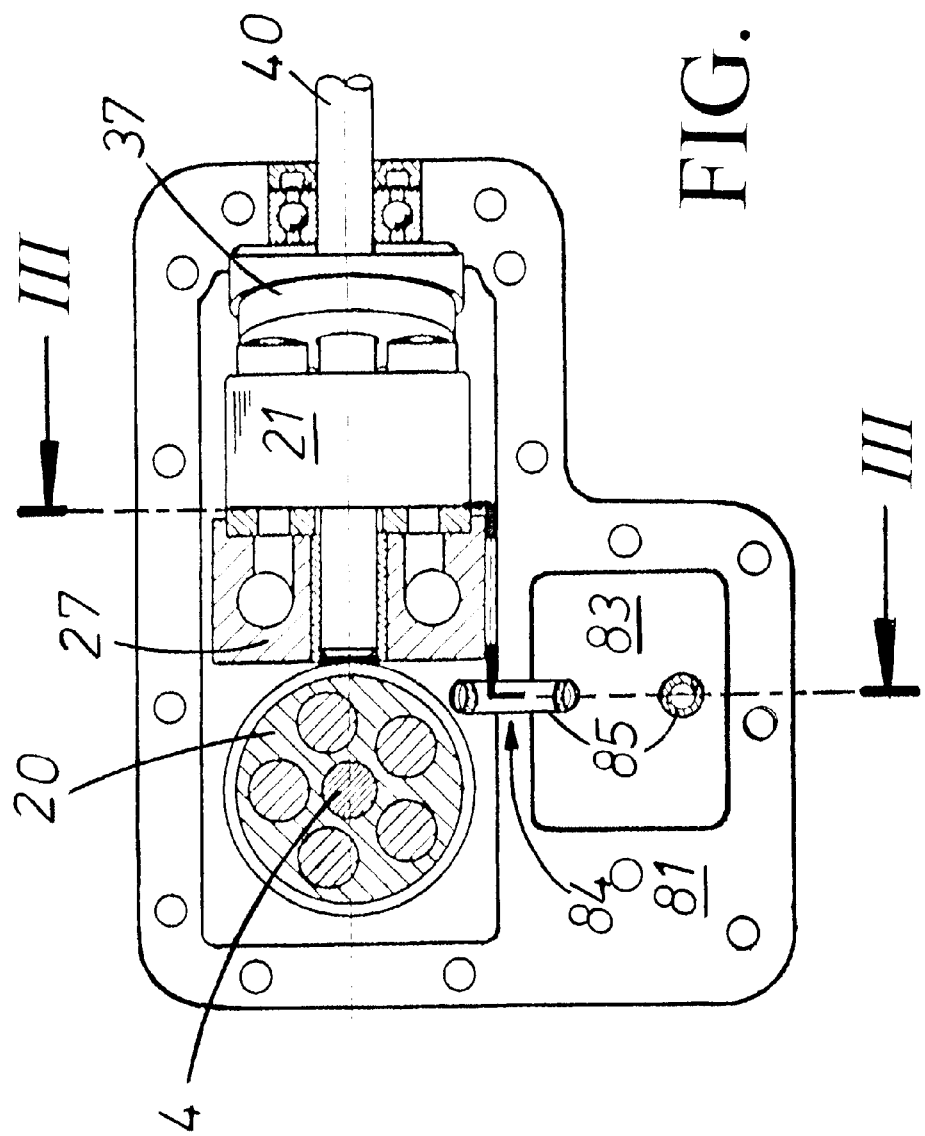
FIG. 4 is a plan view of the interior of a hydrostatic transmission in accordance with a second embodiment of the present invention.
Figure 5:
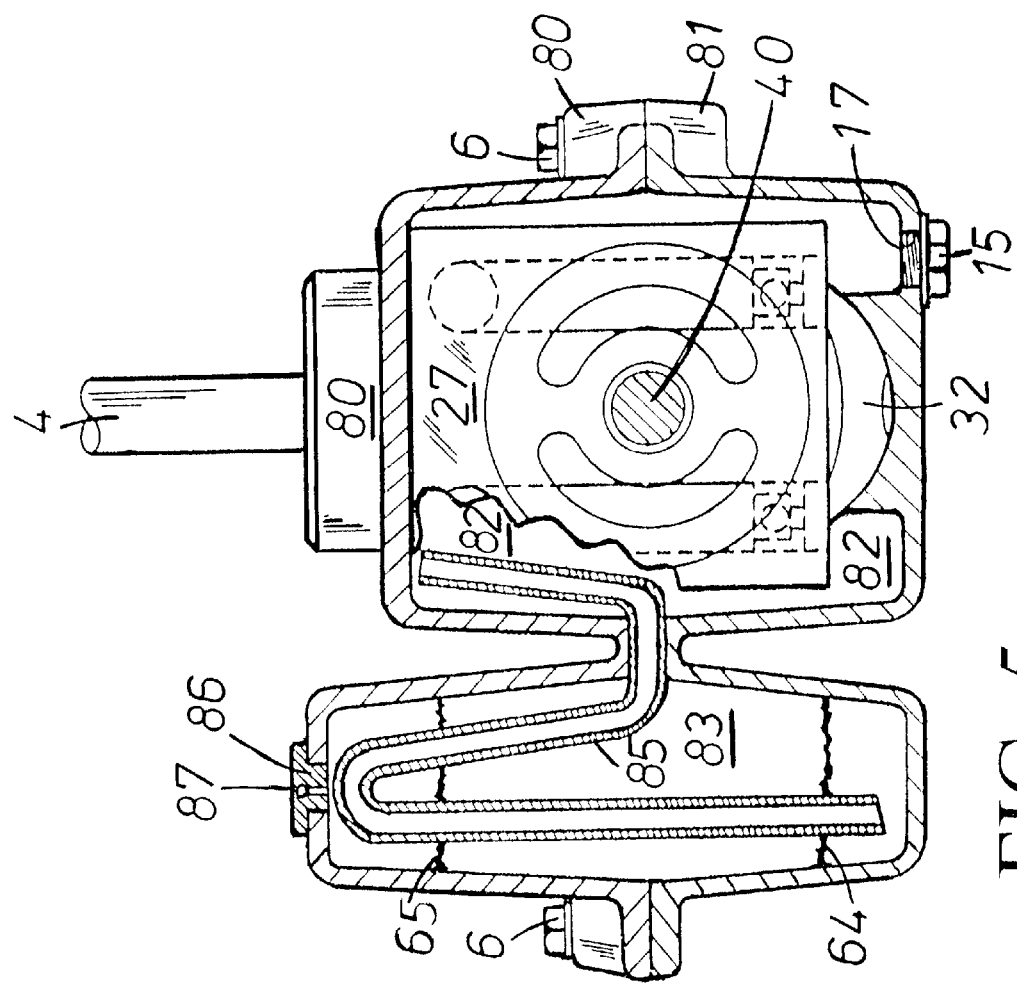
FIG. 5 is a section taken along line III—III of FIG. 4.

In order to minimize the actual volume size required for the overflow receiver, preferred practice is to include a fluid barrier such as the aforementioned shaft-seal between the first internal volume and the gear compartment sump. If on the other hand sufficient interior space could be found enabling a larger overflow receiver to be incorporated within the housing, then the embodiment of the present invention described above could be modified whereby the gear and hydrostatic compartments would be fluidly connected together alone the lines of the "common sump" hydrostatic transaxles mentioned earlier. In this case, there would be no need to include a fluid barrier to prevent hydrostatic fluid in the first internal volume from mixing with the gear lubricant in the gear compartment sump provided the larger overflow receiver has sufficient increased capacity to accommodate the potentially greater displaced volume of fluid from the "common sump", The second embodiment of the invention shown as FIGS. 4 & 5 has been included in order to show the concept of using an internal expansion chamber in the form of an overflow receiver can equally be applied with merit to stand-alone hydrostatic transmissions. As many components relating to the hydrostatic transmission remain substantially similar to those already described for the first embodiment, for convenience sake, they are numbered to carry the same reference numerals as have been designated in the first embodiment. Here the housing comprising elements 80, 81 form a first internal volume 82 to surround the components of the pump 22 and motor 23 and a second internal volume 83 that acts as the overflow receiver. Corridor passage 84 allows the passage of duct 85 such that first and second internal volumes 82, 83 are thereby in fluid communication. Although it is a preferable but not an essential feature of the invention for the second internal volume to operate under slight pressure, a breather could be used in place of the sealing plug in order for over-spill chamber 12 to remain at normal atmospheric conditions. Such a breather could be for instance, of the type having an internal sintered filter which would prevent larger sized particles of solid matter from entering overflow receiver, or alternatively and as shown in this embodiment, a plug 86 with a small vent hole 87 could be used. It would further be possible to manuafacture vent hole 87 as a very small diameter hole to be a throttle to operate as a pressure restriction valve in order that during operation, a slight pressure build-up, perhaps by only one or two psi above atmospheric pressure, would occur in both first and second internal volumes 82, 83 and in effect, create a positive head of pressure in the hydrostatic closed-loop circuit, analogous to using a charge pump to boost the pressure on the intake line of pump 22.

In the case of some output speed reducing gearing being included in the housing package and located between the hydraulic motor and the output shaft in a modified form of "stand alone" hydrostatic transmission, it would be possible for the gear compartment to be fluidly connected to the hydrostatic compartment provided sufficient interior space can still be found enabling a larger overflow receiver to be incorporated within the housing. However, in order to keep the volume size for the overflow receiver to a minimum and minimize contamination problems, it is still to be preferred to install a seal as a fluid barrier on the shaft connecting the hydraulic motor to the gear train.

Figure 6:
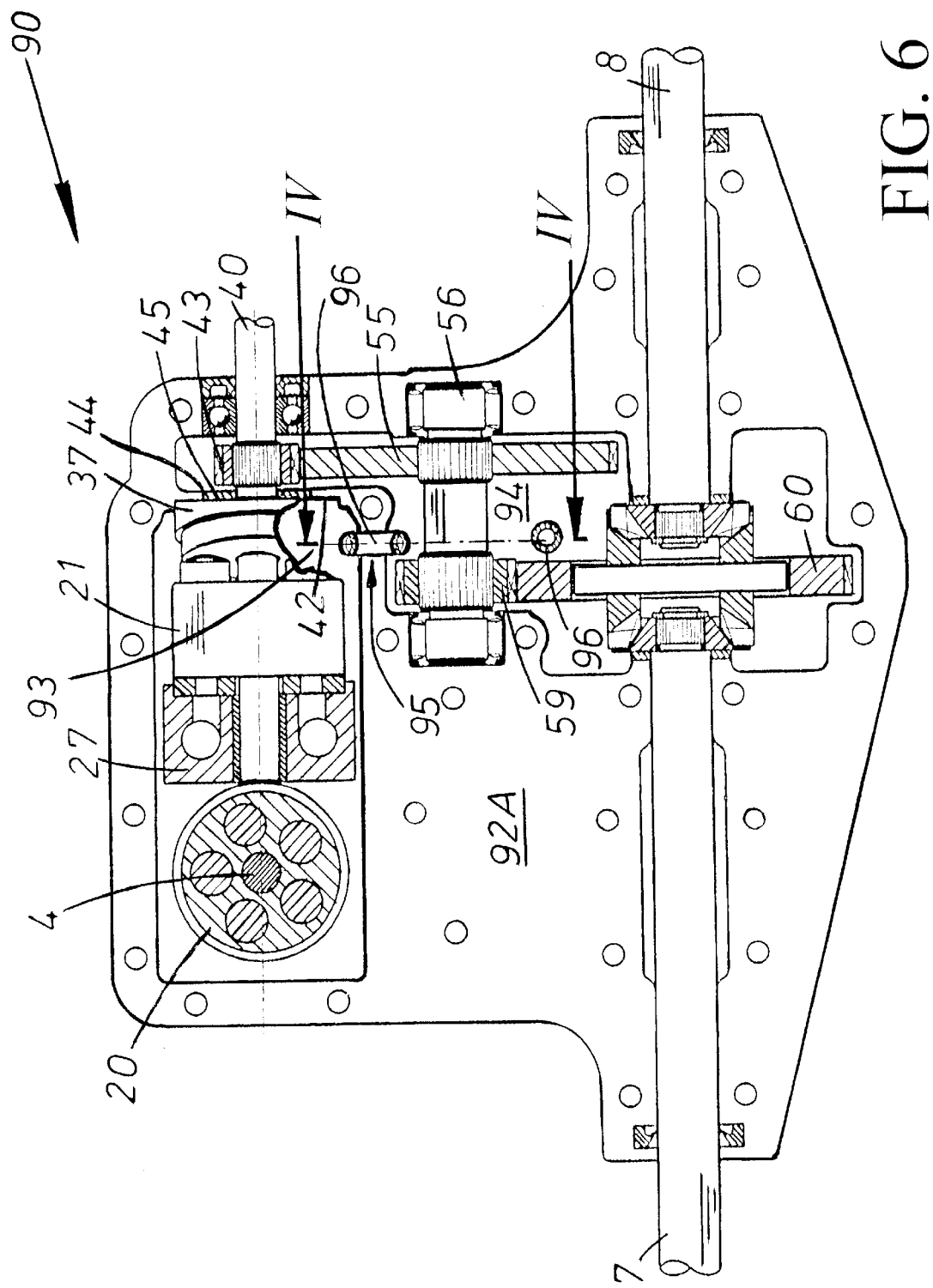
FIG. 6 is a plan view of the interior of a hydrostatic transaxle in accordance with a third embodiment of the present invention.
Figure 7:
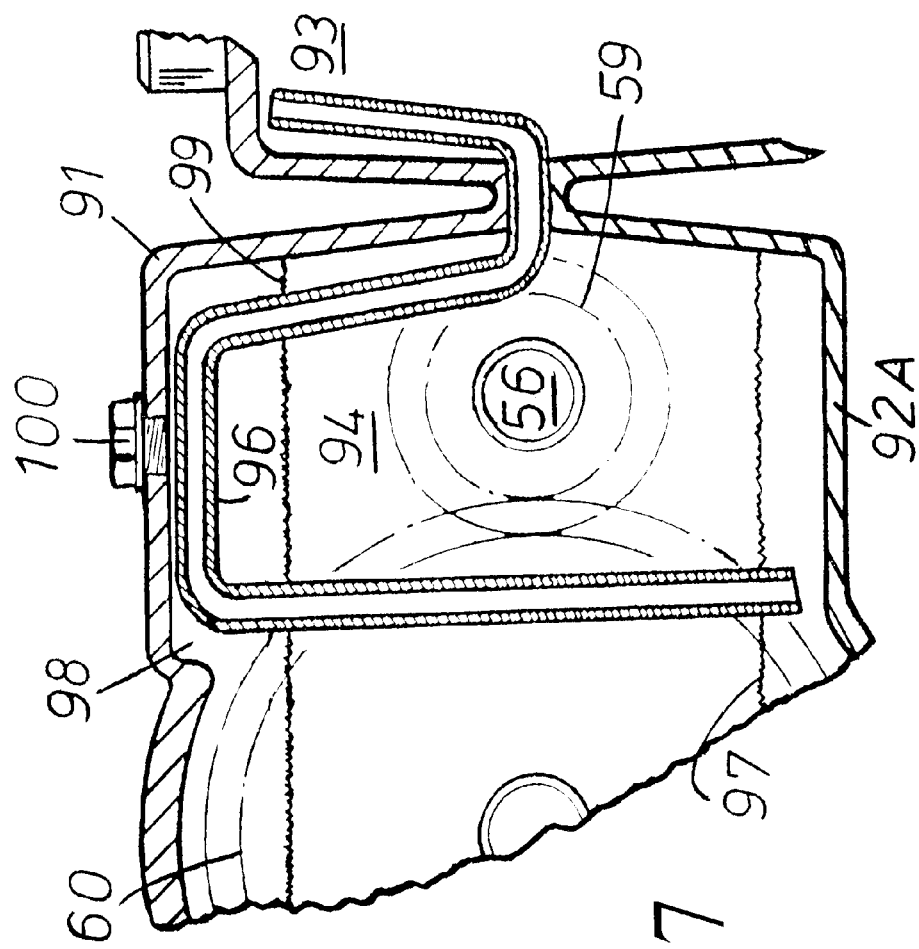
FIG. 7 is a section taken along line IV—IV of FIG. 6.
Figure 8:
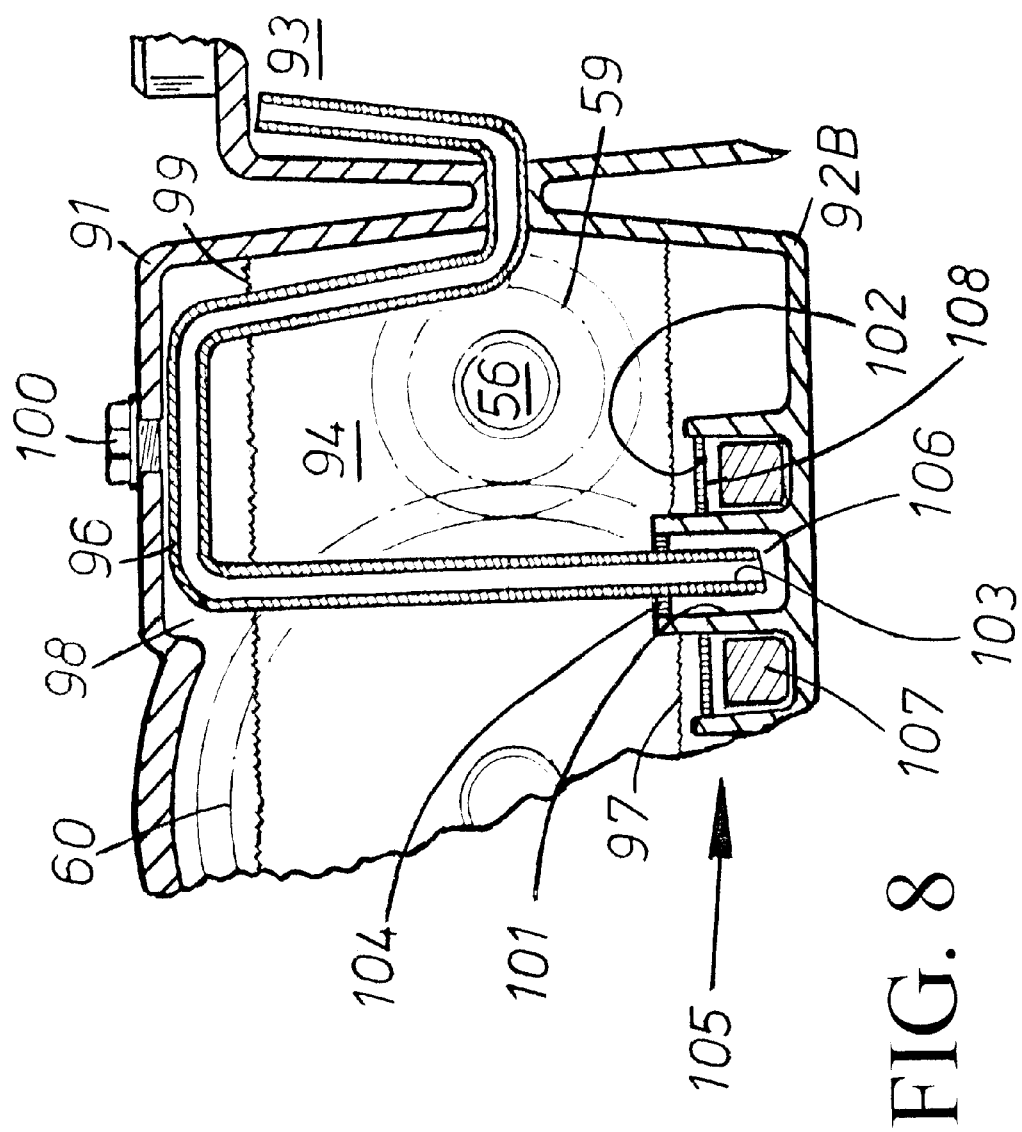
FIG. 8 is a section taken along line IV—IV of FIG. 6 and showing one form of contamination trap.

The third embodiment of the present invention as shown in FIGS. 6 to 8 offers an alternative solution for the location of an internal expansion chamber and contrasts with the hydrostatic transaxle already described as the first embodiment in that here the gear compartment sump performs the dual role for not only containing the gear train but also acting as the overspill receiver for receiving and supplying fluid displaced from the first internal volume containing the hydrostatic transmission. Therefore, in this embodiment, as it is now gear compartment sump that performs the duty as the overspill receiver, the gear compartment sump is to be here designated as being the second internal volume of the present invention. It is therefore a requirement in this embodiment that a fluid barrier be provided in order to prevent fluid in respective first and second internal volumes intermixing in any way other then by way of the permeable siphon duct.

As many components relating to the hydrostatic transmission as well as the reduction gearing remain substantially similar to those already described for the first embodiment, for convenience sake, they are numbered to carry the same reference numerals as have been designated in the first embodiment.

The hydrostatic transaxle 90 is shown having a two-piece housing construction 91, 92A formed to include a first internal volume 93 for the components of the hydrostatic transmission 10; a second internal volume 94 for the components of the gear train 11; and where here the position of corridor passage 95 in wall 42 of housing 92A allows the siphon duct 96 to hydraulically links first 93 and second 94 internal volumes together. As such, an opening 44 is provided in wall 42 in the housing 92A into which rotary-seal 45 is disposed, and seal 45 disposed in opening 44 and engaging drive-shaft 40 of the hydraulic motor 23 thereby provides the required fluid barrier at this junction between first and second internal volumes 93, 94. As a result of any volume change experienced in the fluid capacity of the first internal volume 93 due to temperature change, the fluid within first internal volume 93 has the only recourse to pass through the siphon 96 to effect an equal but opposite volume change of the fluid lubricant held in the second internal volume which for this embodiment is the gear compartment sump 94.

Thereby, the fluid surrounding the hydrostatic transmission components in the first internal volume is allowed to freely mix with the fluid carried in the gear compartment sump by free passage through the siphon duct, and provided that no reliance is being placed on using an external expansion tank, it is most beneficial that second internal volume 94 for the speed reducing apparatus 11 be only partially filled with fluid. With second internal volume 94 only partially filled with fluid when cold denoted by reference numeral 97 as the lower fluid level, there is thereby provided an additional volume space denoted as air pocket 98 within the housing to take care of the expansion in both first 93 and second 94 internal volumes. As warming of the fluid takes place in first internal volume 93, the displaced fluid from first internal volume 93 flows through duct 96 to arrive in the second internal volume, causing a rise in the upper surface level of fluid and a corresponding decrease in the size of air pocket 98. Air pocket 98 will continue to deminish in volume size until such time that steady state conditions have been reached in the unit, the level of fluid within second internal chamber 94 having then reached a maximum as shown as fluid surface level 99.

As soon as the fluid in first and second internal volumes 93, 94 warms up and the fluid level begins to rise from the initial lower level 97 towards upper level 99, air pocket 98 in second internal volume 94 becomes subject to an increase in pressure above atmospheric and continues to diminish in volume size so long as plug 100 is effective in preventing the escape of air fom pocket 98. In this respect, it is equally important that effective seals are used elsewhere in the unit transaxle such as the well-known shaft seals manufactured by the company Freudenberg. Compression of air pocket 98 produces an equal rise in pressure in the first internal volume 93 such that the check-valves 28, 29 operate more efficiently in replenishing lost fluid from the closed-loop circuit passages 25, 36, and a corresponding decrease in operational noise emanating from the hydrostatic transmission 10 is noted.

Once the unit begins to cool, the size of air pocket 98 begins to increase as the fluid surrounding the components of the hydrostatic transmission 10 contracts in volume and draws fluid back through duct 96 from the second internal chamber 94. As this happens, there is a corresponding fall in the level of fluid held in the second internal volume 94.

The fluid level in the gear compartment sump can therefore remain low when the unit is cold, for instance during winter start-up conditions, and then only increases as the unit warms up ensuring the gear train remain well lubricated even as the fluid viscosity falls. Such auto-levelling in the surface level of gear lubricating fluid can ensure that the hydrostatic transaxle has the best operating efficiency possible.

It is therefore a feature of this embodiment that the fluid lubricating the gear train 11 can flow in either direction through duct 96 depending whether the temperature conditions experienced by the machine is rising or falling.

Although as set forth in the example described above, first and second internal volumes 93, 94 as well as whatever remaining void left of air pocket 98, are subject to pressurization due to the fluid carried by the housing being in its expanded state, it is nevertheless not intended to limit the invention in this way. For instance, air pocket 98 could alternatively be pressurized by an inert gas such as nitrogen at the factory once the hydrostatic transaxle has been assembled and filled with operating fluid such that the first and second internal volumes remain pressurized even when the unit is cold and the fluid contained within remains at its minimum volume expanded state.

Furthermore, there may be certain applications where it is still advantageous for the hydrostatic transaxle to operate with the gear compartment sump substantially or completely full of lubricating fluid even when the operating temperatures remain low. In this respect, the embodiment of the invention described as FIGS. 6 to 8 may be modified to include an external expansion tank fitted directly to the housing or by a pipe connection in place of plug 100. Expanding fluid in the first internal volume would be forced through the duct to enter the second internal volume such that the additional would be displaced to the external expansion tank. The external expansion tank could be atmospherically vented or for that matter encased to become pressurized with or without reliance on being charged by an inert gas such as nitrogen. Even so, for many applications, the addition of such an external expansion tank would be impractical as little space exists under the frame of a vehicle for such a tank to be located, and that therefore, it is preferable although not essential feature of the invention to confine all natural variations in fluid volume carried in the first and second internal volumes 93, 94 to within the interior of the transaxle 90.

As the third embodiment of the invention relies on fluid held by the gear compartment sump to replenish any contraction in fluid volume held by the first internal volume due to falling temperature, there would be an advantage if apparatus could be included inside second internal volume for the removal of foreign bodies suspended in the fluid. Fig.8 illustrates one form of contamination settlement trap 105 for the removal of such foreign bodies before they can be ingestion by the siphon duct.

The lower housing element 92B is shown cast wih a sediment and contamination trap arrowed as 105 comprising two wells 101, 102, the inner well 101 is where the open end 103 of siphon duct 96 protrudes into its interior 106 and where a wire gauze strainer in the shape of a hollow disc 104 seats near to the top of the well 101 to prevent larger-sized particulates from entering interior 106 of well 101. The outer well 101 contains one or more magnets 107 which act to attract any ferrous particles of contamination that might be otherwise suspended in the hydrostatic fluid, and where a further wire gauze strainer 108 located above magnet 107 prevents fluid motion from rotating gears 59, 60 from disturbing any foreign bodies that settle as sediment in well 102.

Figure 9:
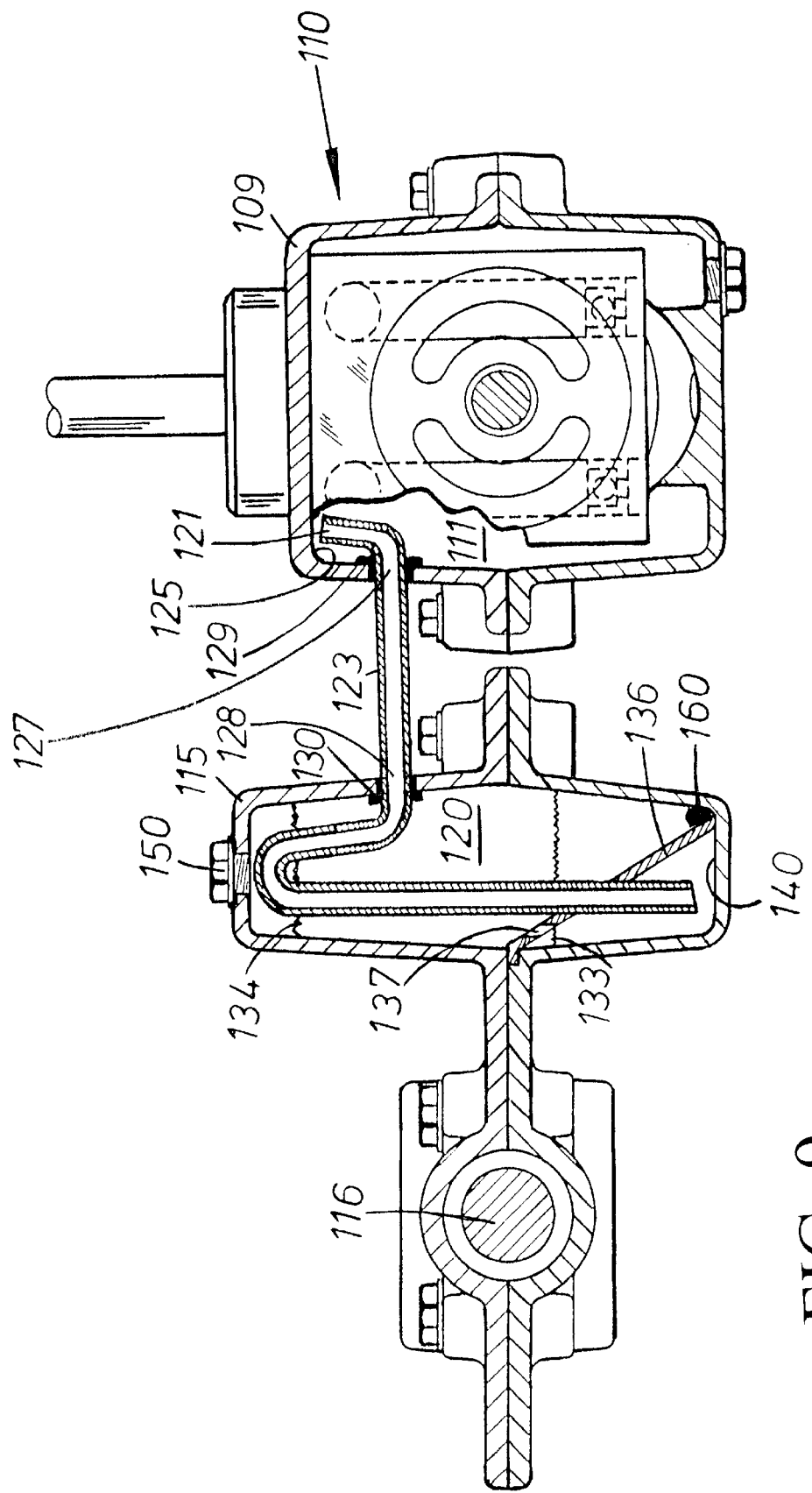
FIG. 9 is a plan view of the interior of a hydrostatic transmission and gear transmission combination in accordance with a fourth embodiment of the present invention.

In the case of hydrostatic and gear reduction transmissions which although connected together in some manner do not share a common housing, the present invention may be adapted so that the first internal volume surrounding the components of the hydrostatic transmission is in fluid communication to the second internal volume surrounding the gear train by a modified form of siphon duct, and where a portion of the siphon duct lies external of the housing constructions in order to be able to span the gap at the interface between the hydrostatic and gear transmissions. As a result of any volume change experienced in the fluid capacity held in the first internal volume due to a change in temperature, the displaced fluid from the first internal volume flows through the siphon duct to effect an equal but opposite volume change in the level of fluid held by the second internal volume. Therefore, according to the fourth embodiment of the invention shown as FIG. 9, housing 109 provides an interior into which components of the hydrostatic transmission 110 are located, the interior defining the first internal volume 111. Adjacent housing 109 is housing 115, housing 115 provides an interior into which various components of the transaxle and gear train are disposed such as axle shaft 116, the interior defining the second internal volume 120.

As shown, one open end 121 of the siphon duct 123 is arranged to be close to the upper interior surface 125 in first internal volume 111 and extends downwards before turning horizontally to exit housing 109 at 127. Siphon duct 123 then extends to span the distance between housings 109, 115 to enter housing 115 at 128. Respective seals 129, 130 are shown surrounding the siphon 123 at the exit 127 and entry 128 points to ensure at leak-free joint.

As the siphon duct 123 protrudes through into second internal volume 120, it is arranged to turn upwards in a direction towards plug 150 before turning downwards and extending towards lower interior wall 140. Preferably, open end 132 of siphon duct 120 should remain submerged at all times below fluid level 133. That portion of siphon duct 123 which extends from exit 127 to entrance 128 should, preferably, be thermally insulated in order to negate the chill factor, especially prevalent in winter conditions.

An alternative form of sediment trap is disclosed in this embodiment and which comprises a baffle plate 136 which is held at a fixed angle in the housing 115 in order that any foreign bodies suspended in the hydrostatic fluid can settle out at the bottom of the second internal volume. The baffle 136 includes one or more holes 137 which allow the fluid below and above the baffle plate to freely mix. When the hydraulic fluid in both first and second internal volumes 111, 120 warms up, the increased volume of fluid causes the surface level to rise to level marked as 134. Once the unit cools down, the fluid level drops back towards 133. As the level drops below hole 137, and once the sediment has settled out, a substantial amount of the sediment shown as 160 will accumulate at the bottom upper side of the baffle 136 and not at the lower side of the baffle where the entrance to siphon duct 123. The accumulation of sediment 160 could be attracted to surround a magnet placed at the bottom upper side of baffle 136 at 160, and a steel baffle in this case has the advantage that it will become thus slightly magnetized with the result that the vast majority of ferrous contaminant suspended in the fluid, for instance, worn from the powder-metal gearing, would become locked-up on the magnetized baffle plate surface as well as the magnet. Hence, quantities of foreign bodies suspended in the fluid in second internal volume 120 that could pass through siphon duct 123 to enter the first internal volume 111 would be small and pose little risk in reducing the useful working life of the hydrostatic transmission 111.

Although neither of the last two embodiments have shown a contamination trap in the form of a cylindrical oil filter attached over the entrance end of the siphon duct, such a filter could be usefully deployed in place of the apparatus already mentioned above. Furthermore, although an axial piston hydrostatic machine has been described, this invention is also applicable to any type or form of hydrostatic power transmitting machine as well as for that matter, other forms or types of speed reduction apparatus.

With respect to the first and second embodiments of the invention, during periods when the hydrostatic fluid within the first internal volume remains cold in at its most contracted state, the fluid level in the overflow receiver need only be as high as necessary to ensure that the siphon vent will operate properly once operation of the hydrostatic transmission commences. With respect to the third and fourth embodiments, the level of fluid held by the second internal volume need only to be sufficient to ensure the gears and support bearings remain sufficiently lubricated. Furthermore, although it is to be preferred for the expanding volume of hydrostatic fluid to cause a pressure increase in both the overflow receiver as well as in the first internal volume, it is not intended to limit this invention in this way. Consequently, many advantages of the present invention are still prevent even when the the second internal volume is arranged to be naturally vented to atmospheric conditions. It should also be noted that although the hydrostatic and gear train components are preferably kept apart within the same housing structure, the invention can be modified such that both hydrostatic transmission and gear train components reside within a common sump, and where in this modification, the overflow be sized sufficiently to enable it to accommodate a greater displacement in volume of fluid from the sump.

The internal fluid expansion chamber of the present invention responds to changed conditions in the environment with far more precision and rapidity than known solutions relying on external devices, especially as there is a more rapid transfer of heat within the housing such that surges in fluid movement are lessened with the result that seal failures and other fluid leakage to the environment are far less likely.

It should be noted that this invention does not preclude the use and incorporation of an input shaft driven "charging" pump for the closed-loop hydrostatic circuit. Such a charge-pump could still be included for operation within the first internal volume and its operation would not detract from the advantage of the present invention. In the case of a such an auxiliary pump being required as a hydraulic power take-off, the return line from hydraulic power take-off would preferably be connected to the overflow receiver which would be very adaptable for carrying varying quantities of fluid, depending on what demands were imposed by the duty cycle of the hydraulic power take-off. Similarly, an externally exposed flexible membrane of the type known as a bellows could also be incorporated with advantage, for example by attachment to the housing so that one one side it is exposed to the atmosphere whereas on the opposite side it is disposed to the overflow receiver. Such a beloows would act as a barrier in preventing airborne contamination from the environment from being ingressed in the hydrostatic fluid of the hydrostatic transmission.

In accordance with the patent statutes, we have described the principles of construction and operation of our invention, and while we have endeavoured to set forth the best embodiments thereof, we desire to have it understood that obvious changes may be made within the scope of the following claims without departing from the spirit of our invention.

We claim:

1. A hydrostatic and gear transmission comprising a housing structure defining first and second internal volumes and a gear compartment sump, a gear train disposed in said gear compartment sump, the first internal volume containing a hydrostatic transmission and providing a receptacle for hydrostatic fluid of said hydrostatic transmission and where said hydrostatic transmission is immersed in said hydrostatic fluid, the second internal volume providing an overflow receiver for said hydrostatic fluid of said first internal volume and vented to the ambient air environment via a pressure restriction valve, said pressure restriction valve to ensure said first and second internal volumes remain at a higher pressure than atmospheric during periods of operation of said hydrostatic transmission, a duct disposed in said housing structure and providing a path for fluid to communicate in at least one direction between said first and second internal volumes, and where said duct operates as a siphon to allow a siphoning action to occur between said first and second internal volumes.

2. The hydrostatic and gear transmission according to claim 1, wherein said hydrostatic transmission includes a fluid power circuit fitted with at least one check-valve for allowing said circuit to recover leakage losses, and where an increase in pressure in said first internal volume promotes an assisted take up of make-up fluid by said at least one check-valve.

3. The hydrostatic and gear transmission according to claim 2, wherein said second internal volume includes apparatus for the removal of foreign bodies suspended in said hydrostatic fluid.

4. The hydrostatic and gear transmission according to claim 3 wherein said apparatus comprises a settlement trap disposed juxtapose said duct.

5. The hydrostatic and gear transmission according to claim 3 wherein said apparatus comprises at least one magnet disposed juxtapose said duct.

6. The hydrostatic and gear transmission according to claim 3 wherein said apparatus comprises a well formed in the interior of said housing structure into which said duct is arranged to protrude into, a wire gauze strainer disposed over said well and at least one magnet disposed external to said well to attract from said hydrostatic fluid magnetizable foreign bodies pervading said second internal volume.

7. The hydrostatic and gear transmission according to claim 3, wherein said apparatus comprises a baffle plate attached to said housing structure and arranged to slant at an angle relative to the surface level of said hydrostatic fluid, at least two holes formed in said baffle plate where one hole is arranged to allow said duct to access through said baffle plate and remaining hole for allowing said hydrostatic fluid to access through said baffle plate to reach an open end of said duct.

8. The hydrostatic and gear transmission according to claim 2, wherein any increase in the effective volume of said hydrostatic fluid within said first internal volume due to the stimulus of heat is accommodated by a corresponding transfer in such excess said hydrostatic fluid to said second internal volume.

9. The hydrostatic and gear transmission according to claim 8, wherein any decrease in the effective volume of said hydrostatic fluid within said first internal volume due to the stimulus of heat is accommodated by a corresponding transfer of said hydrostatic fluid from said second internal volume to said first internal volume.

10. A hydrostatic and gear transmission comprising a housing structure defining first and second internal volumes and a gear compartment sump, a gear train disposed in said gear compartment sump, the first internal volume containing a hydrostatic transmission and providing a receptacle for hydrostatic fluid of said hydrostatic transmission and where said hydrostatic transmission is immersed in said hydrostatic fluid, the second internal volume providing an overflow receiver for said hydrostatic fluid of said first internal volume and prevented from communicating with atmospheric pressure such that said first and second internal volumes are subject to an above atmospheric pressure condition during periods of operation of said hydrostatic transmission, said hydrostatic transmission includes a fluid power circuit fitted with at least one check-valve for allowing said circuit to recover leakage losses, and where an increase in pressure in said first internal volume promotes an assisted take up of make-up fluid by said at least one check-valve, a duct disposed in said housing structure and providing a path for fluid to communicate in at least one direction between said first and second internal volumes, and where said duct operates as a siphon to allow a siphoning action to occur between said first and second internal volumes.

11. The hydrostatic and gear transmission according to claim 10, wherein said second internal volume includes apparatus for the removal of foreign bodies suspended in said hydrostatic fluid.

12. The hydrostatic and gear transmission according to claim 11, wherein said apparatus comprises a settlement trap disposed juxtapose said duct.

13. The hydrostatic and gear transmission according to claim 11, wherein said apparatus comprises at least one magnet disposed juxtapose said duct.

14. The hydrostatic and gear transmission according to claim 11, wherein said apparatus comprises a well formed in the interior of said housing structure into which said duct is arranged to protrude into a wire gauze strainer disposed over said well and at least one magnet disposed external to said well to attract from said hydrostatic fluid magnetizable foreign bodies said second internal volume.

15. The hydrostatic and gear transmission according to claim 11, wherein said apparatus comprises a baffle plate attached to said housing structure and arranged to slant at an angle relative to the surface level of said hydrostatic fluid, at least two holes formed in said baffle plate where one hole is arranged to allow said duct to access through said baffle plate and remaining hole for allowing said hydrostatic fluid to access through said baffle plate to reach an open end of said duct.

16. The hydrostatic and gear transmission according to claim 10, wherein any increase in the effective volume of said hydrostatic fluid within said first internal volume due to the stimulus of heat is accommodated by a corresponding transfer in such excess said hydrostatic fluid to said second internal volume.

17. The hydrostatic and gear transmission according to claim 10, wherein any decrease in the effective volume of said hydrostatic fluid within said first internal volume due to the stimulus of heat is accommodated by a corresponding transfer of said hydrostatic fluid from said second internal volume to said first internal volume.

18. A hydrostatic and gear transmission comprising a housing structure defining first and second internal volumes, the first internal volume containing a hydrostatic transmission and providing a receptacle for hydrostatic fluid of said hydrostatic transmission and where said hydrostatic transmission is immersed in said hydrostatic fluid, the second internal volume providing an overflow receiver for said hydrostatic fluid of said first internal volume and vented to the ambient air environment via a pressure restriction valve, said pressure restriction valve to ensure said first and second internal volumes remain at a higher pressure than atmospheric during periods of operation of said hydrostatic transmission, a duct disposed in said housing structure and providing a path for fluid to communicate in at least one direction between said first and second internal volumes, and where said duct operates as a siphon to allow a siphoning action to occur between said first and second internal volumes.

19. The hydrostatic and gear transmission according to claim 18 and further comprising a gear train disposed in said second internal volume, and where said hydrostatic transmission includes a fluid power circuit fitted with at least one check-valve for allowing said circuit to recover leakage losses, and where an increase in pressure in said first internal volume promotes an assisted take up of make-up fluid by said at least one check-valve.

20. The hydrostatic and gear transmission according to claim 19, wherein said second internal volume includes apparatus for the removal of foreign bodies suspended in said hydrostatic fluid.

21. The hydrostatic and gear transmission according to claim 20, wherein said apparatus comprises a settlement trap disposed juxtapose said duct.

22. The hydrostatic and gear transmission according to claim 20, wherein said apparatus comprises at least one magnet disposed juxtapose said duct.

23. The hydrostatic and gear transmission according to claim 22, wherein said apparatus comprises a well formed in the interior of said housing structure into which said duct is arranged to protrude into a wire gauze strainer disposed over said well and at least one magnet disposed external to said well to attract from said hydrostatic fluid magnetizable foreign bodies pervading said second internal volume.

24. The hydrostatic and gear transmission according to claim 20, wherein said apparatus comprises a baffle plate attached to said housing structure and arranged to slant at an angle relative to the surface level of said hydrostatic fluid, at least two holes formed in said baffle plate where one hole is arranged to allow said duct to access through said baffle plate and remaining hole for allowing said hydrostatic fluid to access through said baffle plate to reach an open end of said duct.

25. The hydrostatic and gear transmission according to claim 19, wherein any increase in the effective volume of said hydrostatic fluid within said first internal volume due to the stimulus of heat is accommodated by a corresponding transfer in such excess said hydrostatic fluid to said second internal volume.

26. The hydrostatic and gear transmission according to claim 25, wherein any decrease in the effective volume of said hydrostatic fluid within said first internal volume due to the stimulus of heat is accommodated by a corresponding transfer of said hydrostatic fluid from said second internal volume to said first internal volume.

27. A hydrostatic and gear transmission comprising a housing structure defining first and second internal volumes, the first internal volume containing a hydrostatic transmission and providing a receptacle for hydrostatic fluid of said hydrostatic transmission and where said hydrostatic transmission is immersed in said hydrostatic fluid, the second internal volume providing an overflow receiver for said hydrostatic fluid of said first internal volume and prevented from communicating with atmospheric pressure such that said first and second internal volumes are subject to an above atmospheric pressure condition during periods of operation of said hydrostatic transmission, said hydrostatic transmission includes a fluid power circuit fitted with at least one check-valve for allowing said circuit to recover leakage losses, and where an increase in pressure in said first internal volume promotes an assisted take up of make-up fluid by said at least one check-valve, a duct disposed in said housing structure and providing a path for fluid to communicate in at least one direction between said first and second internal volumes, and where said duct operates as a siphon to allow a siphoning action to occur between said first and second internal volumes.

28. The hydrostatic and gear transmission according to claim 27 and further comprising a gear train disposed in said second internal volume.

29. The hydrostatic and gear transmission according to claim 28, wherein said second internal volume includes apparatus for the removal of foreign bodies suspended in said hydrostatic fluid.

30. The hydrostatic and gear transmission according to claim 29, wherein said apparatus comprises a settlement trap disposed juxtapose said duct.

31. The hydrostatic and gear transmission according to claim 29, wherein said apparatus comprises at least one magnet disposed juxtapose said duct.

32. The hydrostatic and gear transmission according to claim 29, wherein said apparatus comprises a well formed in the interior of said housing structure into which said duct is arranged to protrude into a wire gauze strainer disposed over said well and at least one magnet disposed external to said well to attract from said hydrostatic fluid magnetizable foreign bodies pervading said second internal volume.

33. The hydrostatic and gear transmission according to claim 29, wherein said apparatus comprises a baffle plate attached to said housing structure and arranged to slant at an angle relative to the surface level of said hydrostatic fluid, at least two holes formed in said baffle plate where one hole is arranged to allow said duct to access through said baffle plate and remaining hole for allowing said hydrostatic fluid to access through said baffle plate to reach an open end of said duct.

34. The hydrostatic and gear transmission according to claim 28, wherein any increase in the effective volume of said hydrostatic fluid within said first internal volume due to the stimulus of heat is accommodated by a corresponding transfer in such excess said hydrostatic fluid to said second internal volume.

35. The hydrostatic and gear transmission according to claim 34, wherein any decrease in the effective volume of said hydrostatic fluid within said first internal volume due to the stimulus of heat is accommodated by a corresponding transfer of said hydrostatic fluid from said second internal volume to said first internal volume.

36. A hydrostatic and gear transmission comprising separate housing structures and defining first and second internal volumes in respective said housing structures, the first internal volume containing a hydrostatic transmission and providing a receptacle for hydrostatic fluid of said hydrostatic transmission and where said hydrostatic transmission is immersed in said hydrostatic fluid, the second internal volume providing an overflow receiver for said hydrostatic fluid of said first internal volume and vented to the ambient air environment via a pressure restriction valve, said pressure restriction valve to ensure said first and second internal volumes remain at a higher pressure than atmospheric during periods of operation of said hydrostatic transmission, a duct disposed in said separate housing structures and providing a path for fluid to communicate in at least one direction between said first and second internal volumes, and where said duct operates as a siphon to allow a siphoning action to occur between said first and second internal volumes.

37. The hydrostatic and gear transmission according to claim 36 and further comprising a gear train disposed in said second internal volume, and where said hydrostatic transmission includes a fluid power circuit fitted with at least one checkvalve for allowing said circuit to recover leakage losses, and where an increase in pressure in said first internal volume promotes an assisted take up of make-up fluid by said at least one check-valve.

38. The hydrostatic and gear transmission according to claim 37, wherein said second internal volume includes apparatus for the removal of foreign bodies suspended in said hydrostatic fluid.

39. The hydrostatic and gear transmission according to claim 38, wherein said apparatus comprises a settlement the disposed juxtapose said duct.

40. The hydrostatic and gear transmission according to claim 38, wherein said apparatus comprises at least one magnet disposed juxtapose said duct.

41. The hydrostatic and gear transmission according to claim 38, wherein said apparatus comprises a well formed in the interior of said housing structure into which said duct is arranged to protrude into a wire gauze strainer disposed over said well and at least one magnet disposed external to said well to attract from said hydrostatic fluid magnetizable foreign bodies pervading said second internal volume.

42. The hydrostatic and gear transmission according to claim 38, wherein said apparatus comprises a baffle plate attached to said housing structure and arranged to slant at an angle relative to the surface level of said hydrostatic fluid, at least two holes formed in said baffle plate where one hole is arranged to allow said duct to access through said baffle plate and remaining hole for allowing said hydrostatic fluid to access through said baffle plate to reach an open end of said duct.

43. The hydrostatic and gear transmission according to claim 37, wherein any increase in the effective volume of said hydrostatic fluid within said first internal volume due to the stimulus of heat is accommodated by a corresponding transfer in such excess said hydrostatic fluid to said second internal volume.

44. The hydrostatic and gear transmission according to claim 43, wherein any decrease in the effective volume of said hydrostatic fluid within said first internal volume due to the stimulus of heat is accommodated by a corresponding transfer of said hydrostatic fluid from said second internal volume to said first internal volume.

45. A hydrostatic and gear transmission comprising separate housing structures and defining first and second internal volumes in respective said housing structures, the first internal volume containing a hydrostatic transmission and providing a receptacle for hydrostatic fluid of said hydrostatic transmission and where said hydrostatic transmission is immersed in said hydrostatic fluid, the second internal volume providing an overflow receiver for said hydrostatic fluid of said first internal volume and prevented from communicating with atmospheric pressure such that said first and second internal volumes are subject to an above atmospheric pressure condition during periods of operation of said hydrostatic transmission, said hydrostatic transmission includes a fluid power circuit fitted with at least one check-valve for allowing said circuit to recover leakage losses, and where an increase in pressure in said first internal volume promotes an assisted take up of make-up fluid by said at least one check-valve, a duct disposed in said separate housing structures and providing a path for fluid to communicate in at least one direction between said first and second internal volumes, and where said duct operates as a siphon to allow a siphoning action to occur between said first and second internal volumes.

46. The hydrostatic and gear transmission according to claim 45 and further comprising a gear train disposed in said second internal volume.

47. The hydrostatic and gear transmission according to claim 46, wherein said second internal volume includes apparatus for the removal of foreign bodies suspended in said hydrostatic fluid.

48. The hydrostatic and gear transmission according to claim 47, wherein said apparatus comprises a settlement trap disposed juxtapose said duct.

49. The hydrostatic and gear transmission according to claim 47, wherein said apparatus comprises at least one magnet disposed juxtapose said duct.

50. The hydrostatic and gear transmission according to claim 47, wherein said apparatus comprises a well formed in the interior of said housing structure into which said duct is arranged to protrude into a wire gauze strainer disposed over said well and at least one magnet disposed external to said well to attract from said hydrostatic fluid magnetizable foreign bodies pervading said second internal volume.

51. The hydrostatic and gear transmission according to claim 47, wherein said apparatus comprises a baffle plate attached to said housing structure and arranged to slant at an angle relative to the surface level of said hydrostatic fluid, at least two holes formed in said baffle plate where one hole is arranged to allow said duct to access through said baffle plate and remaining hole for allowing said hydrostatic fluid to access through said baffle plate to reach an open end of said duct.

52. The hydrostatic and gear transmission according to claim 47, wherein any increase in the effective volume of said hydrostatic fluid within said first internal volume due to the stimulus of heat is accommodated by a corresponding transfer in such excess said hydrostatic fluid to said second internal volume.

53. The hydrostatic and gear transmission according to claim 52, wherein any decrease in the effective volume of said hydrostatic fluid within said first internal volume due to the stimulus of heat is accommodated by a corresponding transfer of said hydrostatic fluid from said second internal volume to said first internal volume.

* * * * *